May 28, 1963     D. F. MASKELL ETAL     3,091,213

FLUID PRESSURE OPERATED WARNING DEVICE

Filed Jan. 14, 1960

United States Patent Office
3,091,213
Patented May 28, 1963

3,091,213
FLUID PRESSURE OPERATED WARNING DEVICE
Dennis Ford Maskell and Malcolm Stewart Wells, Yeovil, Somerset, England, assignors to Normalair Limited, Yeovil, England
Filed Jan. 14, 1960, Ser. No. 2,441
Claims priority, application Great Britain Jan. 22, 1959
6 Claims. (Cl. 116—70)

The invention relates to warning devices of the type that are caused to actuate due to a change in fluid pressure.

It is the object of the invention to provide a fluid pressure operated warning device in communication with a source of pressure and comprising a body divided into a first and second compartment by way of a shoulder member, the first compartment housing pressure closing means, adjustable flow control means upstream of said pressure closing means, the second compartment housing spring urged means in opposition to and in axial alignment with said pressure closing means and fluid pressure communication provided between said pressure closing means and said spring urged means, to a noise emitting means.

It is a further object of the invention to provide a fluid pressure operated warning device wherein said pressure closing means comprise a ball valve provided with a positioning spring, housed within a chamber, which shall hereinafter be referred to as the first chamber as opposed to said first compartment.

It is a further object of the invention to provide a fluid pressure operated warning device wherein said flow control means situated upstream of said pressure closing means, comprises a screw threaded member of the self locking type in axial screw threaded engagement at the pressure inlet to said warning device, said screw threaded member engaging axially in corresponding screw threaded bore of fluid pressure inlet to said warning device, said screw threaded member comprising an elastic material engaging in a self locking manner.

It is a further object of the invention to provide a fluid pressure warning device wherein said screw threaded member comprises a nylon screw.

It is a further object of the invention to provide a fluid pressure warning device wherein said spring urged means comprises a piston assembly adapted to receive one end of a compression spring and provided with an extension for engaging initially with said pressure closing means and laterally with the face of said shoulder member forming the end wall of said second compartment, so providing a space within said second compartment, between the piston and said end wall, which shall hereinafter be referred to as the second chamber.

It is a further object of the invention to provide a fluid pressure warning device wherein said first chamber is small relative to said second chamber formed between said piston assembly and said shoulder member.

It is a further object of the invention to provide a fluid pressure warning device wherein said noise emitting means is caused to emit a note of large volume almost instantly said source of pressure reaches the predetermined low limit.

It is a further object of the invention to provide a fluid pressure warning device as hereinafter described and as shown in the drawing accompanying the specification.

Further objects and advantages of the invention will become apparent from the following detailed description of the invention which may be used in association although not exclusively with fluid pressure containers and is by way of example only.

Figure 1:
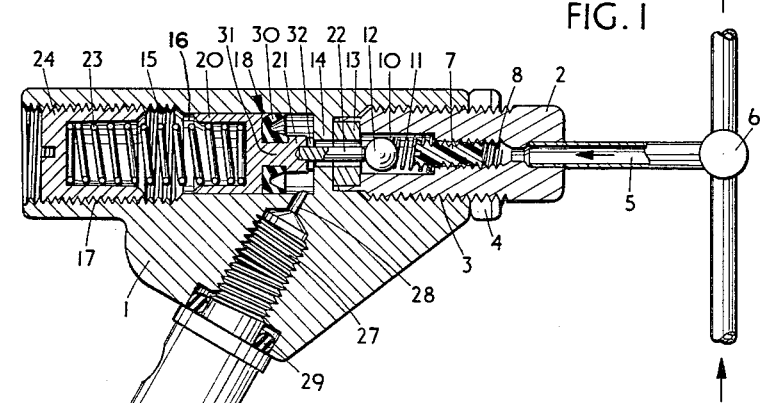
FIGURE 1 is a section through the device showing the valve in the open position.
Figure 2:
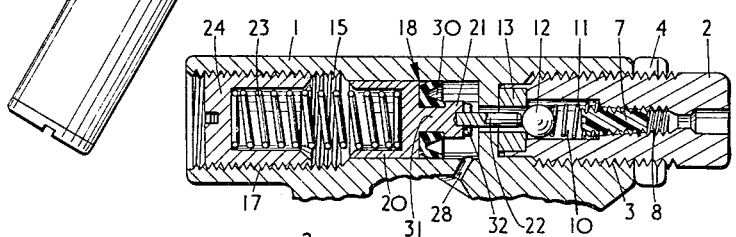
FIGURE 2 is a magnified section of part of the device showing the ball valve in the closed position.
Figure 3:
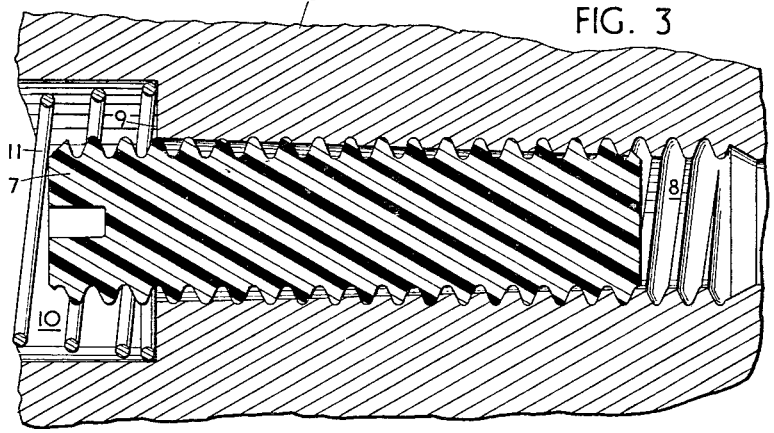
FIGURE 3 is a magnified view of a section through the tapered bore of the regulating device showing the parallel screw within it.

In carrying the invention into effect in one convenient form, referring the drawing, a first body generally indicated at 1, has a second body member 2, screw threaded into the first compartment 3 of said first body 1. Said second body member 2 is held in position by means of locking nut 4. A pipe 5 conveys air under pressure from manifold 6 into the second body member 2. A screw threaded member 7, manufactured from an elastic material, comprises a nylon screw and threadably engages in a screw threaded bore 8 of second body member 2. Said screw threaded bore 8 may be of tapered form, allowing additional control of the air flow around the helices in said bore when a parallel screw is used and providing a degree of self locking. Said screw threaded member 7 comprises an air flow regulator, which controls the flow of air to a first chamber 10 via the manifold 6 and the pipe 5, the air flow being increased or decreased as required by screwing screw threaded member 7 respectively out or in of screw threaded bore 8, to increase or decrease the gap around the thread helices as required. Conical spring 11, tends to position ball 12 against the valve seat 13 whilst the other end of said conical spring 11 abuts against face 9 of first chamber 10. First body 1 is divided into two compartments 3 and 15 by way of shoulder member 14 and the second of these compartments 15 comprises a bore 16 and screw threaded portion 17 and a spring adjusting screw 24. A piston assembly 18 having a flexible seal 30 attached thereto engages in bore 16 and comprises a spring receiving portion 20 which is integral with an extension 31 comprising piston stop 21 and piston rod 22. A second chamber 19 of larger fluid capacity than said first chamber 10 is formed between said piston assembly 18 and shoulder member 14. Said piston rod 22 passes through valve seat 13 and shoulder member 14 to act as a probe for the ball 12 which is separate from said piston rod 22. The position of spring 23 within the spring receiving portion 20 is obtained by rotation of screw threaded adjuster 24. Whistle assembly 25 incorporating whistle 26, threadably engages in bore 27 of said first body 1 in sealing engagement with O ring 29 between said first body 1 and whistle assembly 25 and communicates with said second chamber 19 by way of passageway 28.

In operation, when the breathing apparatus is operating normally at a "safe pressure" i.e., when the pressure of the air from the air pressure container to the breathing mask is high, the corresponding pressure in first chamber 10 is in excess of the pressure exerted by the spring 23 on the piston assembly 18, the ball 12 is held in the closed position against the valve seat 13. When the pressure of the air in the air pressure container reaches a predetermined low pressure, force in spring 23 overcomes the pressure of the air acting on the ball 12 and moves piston assembly 18 towards the shoulder member 14 and thereby initially pushes the ball 12 away from the valve seat 13, and laterally engages piston stop 21 having airways 32 upon the shoulder member 14. Ball 12 is instantly pushed away from the valve seat 13. Air is thereby allowed to flow from the manifold 6 via pipe 5 into the flow control regulator 7 which reduces the flow, the reduced flow flows through first chamber 10, valve seat 13, airways 32, second chamber 19 and passageway 28 to whistle assembly 25. Initially the air pressure in first chamber 10 is high relative to second chamber 19 at ambient pressure and by virtue of the fact that second chamber 19 is larger than first chamber 10. Air expands and dissipates instantly from first chamber 10 into second chamber 19 and almost instantaneously actuates whistle 26. Thereinafter a steady air flow is maintained by means of said flow control regulator 7, to continue to actuate said whistle 26. Upon actuation of said whistle 26, a note of large volume notifies the user that the quantity of air at the supply is becoming limited.

We claim as our invention:

1. A fluid pressure operated warning device in communication with a pressure source, comprising a first body member, a shoulder within said first body member dividing said body into first and second compartments communicating with one another by way of a hole formed by said shoulder member, a second body member communicating with said fluid pressure source and positioned in said first compartment, a first chamber housing within said second body member, a ball valve seatable on said hole formed by said shoulder, spring means engaging a wall of said first chamber and said ball valve and urging said ball valve into a seating position with said hole, a piston assembly including a piston, flexible seal, stop and rod slidable in said second compartment, a second chamber formed on one side of said piston adjacent said shoulder member, said rod passing through said hole formed by said shoulder and engaging said ball valve, variable resilient means in said second compartment engaging said piston assembly for urging said ball valve away from said hole with a force exceeding said spring means and fluid pressure acting upon said ball valve, when said fluid pressure is below a predetermined value, adjustable flow regulating means for permitting substantially constant fluid flow at a given setting from said first chamber to said second chamber, and means communicating with said second chamber actuated by said fluid for emitting noise.

2. A warning device as claimed in claim 1, wherein said adjustable flow regulating means is disposed immediately downstream of said pressure source, said first chamber housing said ball valve is disposed immediately downstream of said flow regulating means, said second chamber is disposed immediately downstream of said ball valve and said noise emitting means is disposed immediately downstream of said second chamber.

3. A warning device as claimed in claim 2, wherein said fluid space in said first chamber is sufficiently small and said fluid space in said second chamber sufficiently large to permit substantially instant expansion of said fluid in said first chamber when said ball valve opens.

4. A warning device as claimed in claim 1, wherein said second body member defines a threaded bore, and said flow regulating means comprises a screw threaded member threadable into said bore.

5. A warning device as claimed in claim 4, wherein adjustment of said flow regulating means is effected by said thread in said bore being tapered.

6. A warning device as claimed in claim 4, wherein the screw threaded member comprises an elastic material.

References Cited in the file of this patent
UNITED STATES PATENTS

| | | |
|---|---|---|
| 982,106 | Thornycraft | Jan. 17, 1911 |
| 1,424,278 | Brown | Aug. 1, 1922 |
| 1,878,411 | Lambert | Sept. 20, 1932 |
| 2,921,551 | Hagger | Jan. 19, 1960 |
| 2,964,366 | Reynolds | Dec. 13, 1960 |